(12) United States Patent
Maruyama et al.

(10) Patent No.: US 8,651,846 B2
(45) Date of Patent: Feb. 18, 2014

(54) ABNORMALITY DETECTION APPARATUS OF AN INJECTION MOLDING MACHINE

(75) Inventors: Junpei Maruyama, Yamanashi (JP); Minoru Kobayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 58 days.

(21) Appl. No.: 13/517,735

(22) Filed: Jun. 14, 2012

(65) Prior Publication Data

US 2013/0095200 A1 Apr. 18, 2013

(30) Foreign Application Priority Data

Oct. 18, 2011 (JP) .................. 2011-228873

(51) Int. Cl.
*B29C 45/77* (2006.01)
(52) U.S. Cl.
USPC ......... 425/145; 264/40.5; 264/40.7; 425/149; 425/150
(58) Field of Classification Search
USPC .............. 425/145, 149, 150; 264/40.5, 40.7
See application file for complete search history.

(56) References Cited

U.S. PATENT DOCUMENTS

| | | | |
|---|---|---|---|
| 6,409,495 | B1 | 6/2002 | Kamiguchi et al. |
| 6,527,534 | B1 | 3/2003 | Kamiguchi et al. |
| 2012/0248658 | A1 * | 10/2012 | Gleiman et al. ........... 425/174.6 |
| 2013/0156875 | A1 * | 6/2013 | Maruyama et al. ........... 425/150 |

FOREIGN PATENT DOCUMENTS

| | | |
|---|---|---|
| JP | 2-008025 A | 1/1990 |
| JP | 2-106315 A | 4/1990 |
| JP | 2001030326 A | 2/2001 |
| JP | 2001038775 A | 2/2001 |
| JP | 2004-330527 A | 11/2004 |
| JP | 2004330529 A | 11/2004 |
| JP | 2005280015 A | 10/2005 |

OTHER PUBLICATIONS

Office Action corresponding to JP2011-228873, dated Nov. 13, 2012.

* cited by examiner

*Primary Examiner* — Tim Heitbrink
(74) *Attorney, Agent, or Firm* — Lowe Hauptman & Ham, LLP (57) ABSTRACT

A reference physical quantity and a current physical quantity are successively compared with each other in association with an elapsed time during which a moving part operates or an operating position of the moving part, and a deviation of the physical quantity is determined. An average of absolute values of the determined deviations of the physical quantities is calculated, and a threshold corresponding to the elapsed time during which the moving part operates or the operating position of the moving part is calculated such that the threshold increases as the calculated absolute value increases. Abnormality is detected if the calculated threshold is exceeded by the determined deviation of the physical quantity.

6 Claims, 5 Drawing Sheets

ABNORMALITY DETECTION APPARATUS OF AN INJECTION MOLDING MACHINE

RELATED APPLICATIONS

The present application is based on, and claims priority from, Japanese Application Number 2011-228873, filed Oct. 18, 2011, the disclosure of which is hereby incorporated by reference herein in its entirety.

BACKGROUND OF THE INVENTION

1. Field of the Invention

The present invention relates to an abnormality detection apparatus of an injection molding machine.

2. Description of the Related Art

In a mold opening-closing operation or molded-product ejecting operation in an injection molding cycle for manufacturing molded products using an injection molding machine, a reference load of a motor for driving a moving part is first stored in association with the time or the position of the moving part. Then, the stored reference load and an actual load of the motor are successively compared in association with the time or the position of the moving part. Abnormality in the mold opening-closing operation or ejecting operation is detected based on whether or not a preset threshold is exceeded by a deviation between the stored reference load and an actual load, whereupon the operation of the injection molding machine is stopped at once. In this way, a mold and mechanical parts of the injection molding machine are prevented from being broken.

Abnormality detection techniques for such breakage prevention are disclosed in, for example, Japanese Patent Applications Laid-Open Nos. 2001-30326 and 2001-38775. In these techniques, a load for one past cycle or a load determined by calculating the moving average of loads for a plurality of past cycles during which normal mold opening-closing operations or normal ejecting operations are performed is set as a reference load. According to the techniques disclosed in these patent documents, however, an operator must set a threshold for abnormality detection, and an operation for setting the threshold may be a burden to the operator.

Further, control techniques for an injection molding machine are disclosed in Japanese Patent Applications Laid-Open Nos. 2004-330529 and 2005-280015. In these techniques, a threshold is determined based on the average and variance of motor currents detected in the past. In calculating the average and variance of the motor currents detected in the past, according to the techniques disclosed in these patent documents, however, a large storage capacity is needed to store detected values for a predetermined shot count, and arithmetic processing of plenty of stored detected values requires a massive computation.

SUMMARY OF THE INVENTION

In order to solve the above-described problems, an object of the present invention is to automatically set a threshold for abnormality detection, thereby reducing an operator's burden and calculating an optimum threshold for abnormality detection. An additional object of the invention is to provide an abnormality detection apparatus that can be easily attached to a controller of a conventional injection molding machine without requiring a large volume of processing or large storage capacity for abnormality detection.

An abnormality detection apparatus of an injection molding machine according a first aspect of the present invention comprises: a drive unit that drivingly controls a servomotor to drive a moving part; a physical quantity detection unit that detects a load applied to the servomotor or a speed, current or position error of the servomotor, as a physical quantity; a storage unit that stores the detected physical quantity as a reference physical quantity in association with an elapsed time during which the moving part operates or an operating position of the moving part; a physical quantity deviation calculation unit that successively compares the stored reference physical quantity and a current physical quantity with each other in association with the elapsed time during which the moving part operates or the operating position of the moving part, thereby determining a deviation of the physical quantity; an absolute value calculation unit that calculates an absolute value of the determined deviation of the physical quantity; an average calculation unit that calculates an average of the calculated absolute values of deviations of the physical quantities; and a threshold calculation unit that calculates a threshold corresponding to the elapsed time during which the moving part operates or the operating position of the moving part, based on the calculated absolute value of the deviation of the physical quantity, such that the threshold increases as the calculated absolute value of the deviation of the physical quantity increases, wherein abnormality is detected if the threshold calculated by the threshold calculation unit is exceeded by the deviation of the physical quantity determined by the physical quantity deviation calculation unit.

An abnormality detection apparatus of an injection molding machine according to a second aspect of the present invention comprises: a drive unit that drivingly controls a servomotor to drive a moving part; a physical quantity detection unit that detects a load applied to the servomotor or a speed, current or position error of the servomotor, as a physical quantity; a calculation unit that calculates an average of the physical quantities within a predetermined number of cycles in association with an elapsed time during which the moving part operates or an operating position of the moving part; a storage unit that stores the calculated average of the physical quantities; a physical quantity deviation calculation unit that successively compares the stored average of the physical quantities and a current physical quantity in association with the elapsed time during which the moving part operates or the operating position of the moving part, thereby determining a deviation of the physical quantity; an absolute value calculation unit that calculates an absolute value of the determined deviation of the physical quantity; an average calculation unit that calculates an average of the calculated absolute values of deviations of the physical quantities; and a threshold calculation unit that calculates a threshold corresponding to the elapsed time during which the moving part operates or the operating position of the moving part, based on the calculated absolute value of the deviation of the physical quantity, such that the threshold increases as the calculated absolute value of the deviation of the physical quantity increases, wherein abnormality is detected if the threshold calculated by the threshold calculation unit is exceeded by the deviation of the physical quantity determined by the physical quantity deviation calculation unit.

The abnormality detection apparatus of an injection molding machine according to each of the first and second aspects of the invention may further comprise a storage unit that stores the calculated average of the absolute values of the deviations in association with the elapsed time during which the moving part operates or the operating position of the moving part. The average calculation unit may calculate the average of the absolute values of deviations of the physical quantities according to the following equation, $$R(n,x) = |E(n,x)|/n + R(n-1,x) \times (n-1)/n$$

where n is the number of cycles performed since the start of threshold calculation, x is an elapsed time or position of a moving part, R(n, x) is the average of the absolute values of deviations at x for first to n-th cycles, and E(n, x) is the deviation at x in the n-th cycle, in association with the elapsed time during which the moving part operates or the operating position of the moving part. The threshold calculation unit may calculate the threshold according to the following equation, $$L(n,x) = \alpha \times R(n,x) + \beta$$

where L(n, x) is a threshold at x in the n-th cycle and $\alpha$ and $\beta$ are coefficients ($\alpha > 0$).

The abnormality detection apparatus of an injection molding machine according to each of the first and second aspects of the invention may further comprise a storage unit that stores the calculated threshold in association with the elapsed time during which the moving part operates or the operating position of the moving part. The threshold calculation unit may calculate the threshold according to the following equation $$L(n,x) = |E(n,x)|\alpha/n + \{L(n-1,x) - \beta\} \times (n-1)/n + \beta,$$

where n is the number of cycles performed since the start of threshold calculation, x is an elapsed time or position of a moving part, E(n, x) is a deviation at x in the n-th cycle, L(n, x) is a threshold at x in the n-th cycle, and $\alpha$ and $\beta$ are coefficients ($\alpha > 0$).

According to the present invention, an operator's burden can be reduced by automatically setting a threshold for abnormality detection and an optimum threshold for abnormality detection can be calculated. Further, there can be provided an abnormality detection apparatus that can be easily attached to a controller of a conventional injection molding machine without requiring a large volume of processing or large storage capacity for abnormality detection.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

An abnormality detection apparatus of an injection molding machine according to the present invention comprises a load deviation calculation unit that calculates a deviation between a present load on a moving part and a previously stored reference load. Abnormality is detected if a predetermined threshold is exceeded by the load deviation calculated by the load deviation calculation unit. The abnormality detection apparatus further comprises a threshold calculation unit that calculates the average of the absolute values of the deviations calculated by the load deviation calculation unit and then calculates a threshold of abnormality detection based on the calculated average. In the calculation of the threshold by the threshold calculation unit, a relatively large threshold is set if the average of the absolute values of the deviations calculated by the load deviation calculation unit is large. If the average of the absolute values of the calculated deviations is small, in contrast, a relatively small threshold is set.

One embodiment of the abnormality detection apparatus of an injection molding machine according to the present invention will now be described with reference to the schematic system block diagram of FIG. 1.

The body part of the injection molding machine comprises a mold clamping unit and an injection unit disposed on a machine base 15. The mold clamping unit comprises a fixed platen 1, rear platen 2, movable platen 3, toggle link mechanism 6, etc. The injection unit comprises an injection cylinder 20, injection screw 22, injection servomotor 25, etc. As described later, the mold clamping unit and injection unit are provided with moving parts, such as the movable platen 3, an ejector device 13, the injection screw 22, etc.

The mold clamping unit will be described first. The fixed platen 1 and the rear platen 2 are connected to each other by a plurality of tie-bars 4. The movable platen 3 is disposed between the fixed platen 1 and the rear platen 2 for movement along the tie-bars 4. Further, a fixed mold half 5a of a mold 5 is mounted on the fixed platen 1, and a movable mold half 5b of the mold 5 is mounted on the movable platen 3.

The toggle link mechanism 6 is disposed between the rear platen 2 and the movable platen 3, and a nut on its crosshead 6a threadedly engages a ball screw 7 that is pivotably and axially immovably mounted on the rear platen 2. A timing belt 9 is passed around and between a pulley 10 on the ball screw 7 and a pulley 11 on the output shaft of a mold clamping servomotor 8.

The ball screw 7 is driven by the mold clamping servomotor 8 through power transmission means including the pulley 11, belt 9 and pulley 10. Thereupon, the crosshead 6a of the toggle link mechanism 6 is advanced or retreated (or moved to the right or left of FIG. 1) to drive the toggle link mechanism 6, and the movable platen 3 is moved toward the fixed platen 1 (or forward) or away from it (or backward). In this way, the mold 5 (fixed and movable mold halves 5a and 5b) is closed, clamped, or opened.

A position/speed sensor 12, such as an encoder, for detecting the rotational position and speed of the servomotor 8 is mounted on the mold clamping servomotor 8. The respective positions of the crosshead 6a and the movable platen 3 (or the movable mold half 5b) can be detected by a position feedback signal from the position/speed sensor 12.

The ejector device 13 is a device for ejecting a molded product from the movable mold half 5b on the movable platen 3. The ejector device 13 transmits the rotational force of an ejector servomotor 13a to an eject pin (not shown) through power transmission means 13c, formed of a timing belt and a ball screw/nut mechanism 13d, and causes the ejector pin to project into the movable mold half 5b, thereby ejecting the molded product from the movable mold half 5b. A position/speed sensor 13, which detects the rotational position and speed of the ejector servomotor 13a is mounted on the ejector servomotor 13a, thereby detecting the position and speed of the ejector pin.

The rear platen 2 is provided with a clamping force adjusting mechanism 14. Nuts (not shown) in engagement with screws provided on the tie-bars 4 are rotated by a clamping force adjusting servomotor 14a through power transmission means that constitutes the clamping force adjusting mechanism 14, thereby changing the position of the rear platen 2 relative to the tie-bars 4 (or changing the position of the fixed platen 1 on the machine base 15) so that the mold clamping force is adjusted. The mold clamping device, ejector mechanism, etc., are known ones that have conventionally been provided for injection molding machines.

The following is a description of the injection unit. A hopper 27 for supplying a resin material to the injection cylinder 20 is disposed on top of the injection cylinder 20. A nozzle portion 21 is mounted on the distal end of the injection cylinder 20, while the injection screw 22 is passed through the injection cylinder 20.

The injection unit is provided with a pressure sensor (not shown), such as a load cell, for detecting the pressure of a molten resin in the injection cylinder 20.

The injection screw 22 is rotated forward and backward by a screw rotation servomotor 23 with the aid of transmission means 24 formed of pulleys, timing belt, etc. Further, the injection screw 22 is driven by the injection servomotor 25 with the aid of transmission means 26 including mechanisms for converting rotary motion into linear motion, such as pulleys, belt, ball screw/nut mechanism, etc., and moves in the injection cylinder 20 in the direction of the axis of the injection cylinder 20. An encoder (not shown) for detecting the rotational position and speed of the injection screw 22 is mounted on the screw rotation servomotor 23. Further, an encoder for detecting the axial position and speed of the injection screw 22 is mounted on the injection servomotor 25.

The following is a description of a controller 30 for controlling the injection molding machine. The controller 30 comprises a processor (CPU) 35, memory 34 formed of a RAM 34a, ROM 34b, etc., bus 33, and display interface 36. The memory 34 and the display interface 36 are connected to the CPU 35 by the bus 33. The ROM 34b is stored with software for controlling the operation of the movable platen 3, ejection control software for controlling the ejector device 13, and other pieces of software for generally controlling the injection molding machine. As the controller 30 of FIG. 1 for controlling the injection molding machine is used to construct the abnormality detection apparatus of the present invention, the ROM 34b of the memory 34 is stored with various pieces of software for abnormality detection.

A liquid-crystal display device 37 is connected to the display interface 36. Further, a servo interface 32 is connected with a servo amplifier 31, which drives the moving parts of the injection molding machine, thereby controlling the positions and speeds of the servomotors. The position/speed sensors attached to the servomotors for driving the moving parts are connected to the servo amplifier 31. Manual input means (not shown) is connected to the display interface 36.

Figure 1:
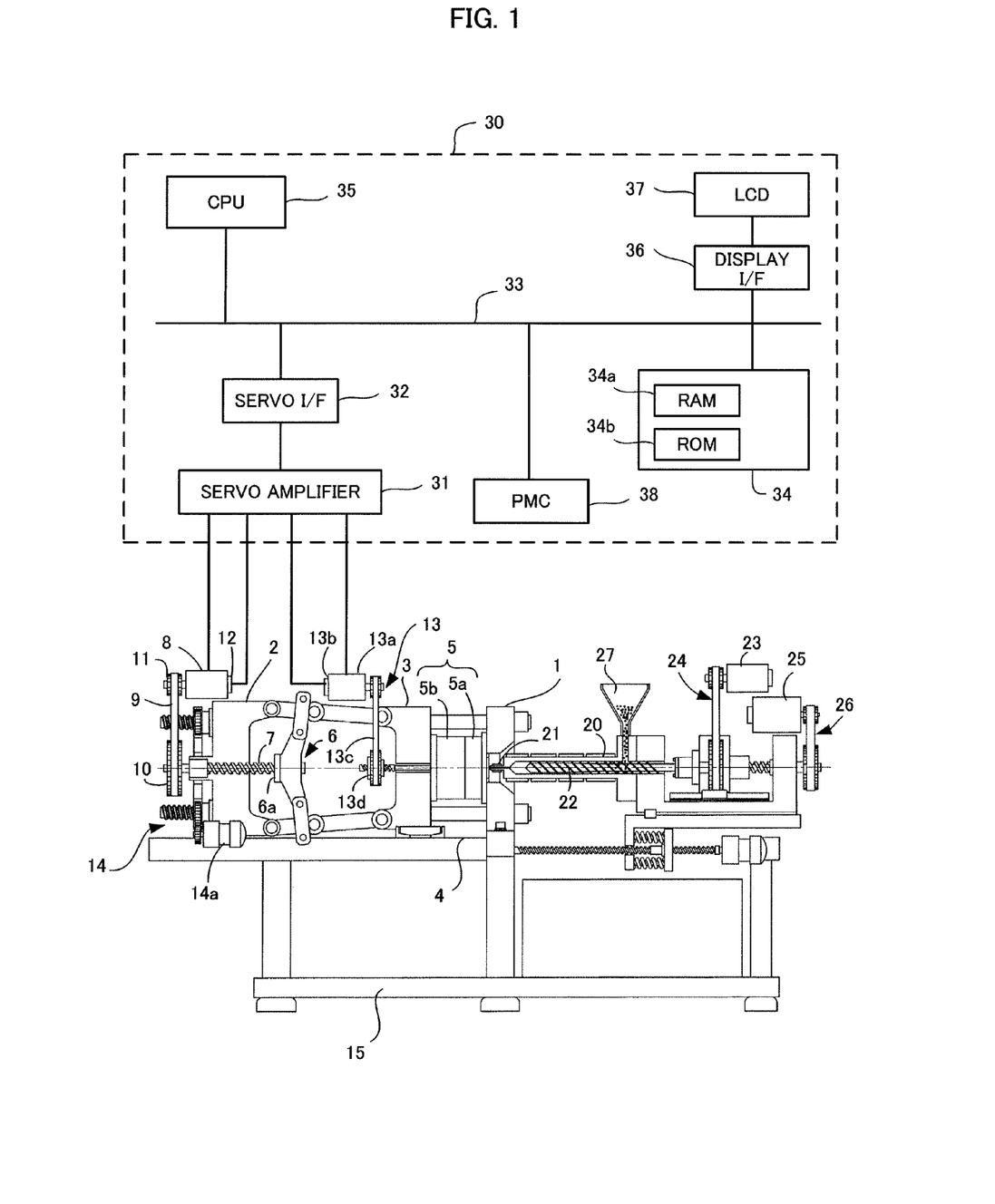
FIG. 1 is a schematic block diagram of an embodiment of an abnormality detection apparatus of an injection molding machine according to the present invention.

While a plurality of servomotors are used to drive the moving parts of the injection molding machine, only the servo amplifier 31 for the mold clamping servomotor 8 and the ejector servomotor 13a are shown in FIG. 1. The servo amplifier 31 is connected to the respective position/speed sensors 12 and 13b of the servomotors 8 and 13a so that position/speed detection signals delivered from the sensors 12 and 13b are fed back to the servo amplifier 31. Illustration of servo amplifiers for the screw rotation servomotor 23 and the injection servomotor 25 and position/speed sensors attached to the servomotors 23 and 25 is omitted.

The CPU 35 executes programs previously stored in the ROM 34b of the memory 34 according to molding conditions and the like and outputs move commands for the moving parts of the injection molding machine to the servo amplifier 31 through the servo interface 32. Based on the received move commands and position/speed feedback signals from the position/speed sensors 12 and 13b, the servo amplifier 31 performs position/speed feedback control. Based on current feedback signals from a current sensor (not shown), moreover, the servo amplifier 31 performs current feedback control, drivingly controlling the servomotors 8 and 13a. The servo amplifier 31, like a conventional one, comprises a processor, memory, etc., and performs processing such as the position/speed feedback control by software processing.

The following is a description of threshold calculation performed by the abnormality detection apparatus of the injection molding machine according to the present invention.

Threshold Calculation Based on Equations (1) and (2)

(1) The present load on each moving part and a previously stored reference load are compared with each other according to the time or the position of the moving part, and a load deviation corresponding to the time or the position of the moving part is calculated.

(2) The absolute value of the calculated deviation is calculated.

(3) Arithmetic processing of the following equation (1) is performed in association with the time or the position of the moving part, based on the calculated absolute value of the deviation and the average of the absolute values of the deviations calculated in the preceding cycle, whereby the average of the absolute values of the deviations corresponding to the time or the position of the moving part is calculated and stored.

$$R(n,x)=|E(n,x)|/n+R(n-1,x)\times(n-1)/n, \quad (1)$$

where n is the number of cycles performed since the start of threshold calculation; x, elapsed time or position of the moving part; R(n, x), average of the absolute values of the deviations at x for first to n-th cycles; and E(n, x), deviation at x in the n-th cycle.

(4) Arithmetic processing of the following equation (2) is performed in association with the time or the position of the moving part, based on the absolute value of the deviation calculated according to equation (1), whereby a threshold corresponding to the time or the position of the moving part is calculated.

$$L(n,x)=\alpha\times R(n,x)+\beta, \quad (2)$$

where L(n, x) is a threshold at x in the n-th cycle and $\alpha$ and $\beta$ are coefficients ($\alpha>0$).

(5) The threshold calculated according to equation (2) and the calculated absolute value of the deviation are compared with each other according to the time or the position of the moving part. If the threshold is exceeded by the absolute value of the deviation, abnormality of the moving part is detected.

(6) Thereafter, the processes of (1) to (5) are repeated to calculate the threshold corresponding to the time or the position of the moving part for each cycle, whereby abnormality detection can be achieved with an optimum threshold.

After the arithmetic processing of equation (1) is performed, in the process (3), newly calculated R(n, x) is overwritten and stored in a memory area in which R(n−1, x) has been stored, and the stored value is used in the arithmetic processing of equation (1) in the next cycle. If this is done, it is necessary only to store the average of the absolute values of the deviations corresponding to the time or the position of the moving part for each cycle, so that the threshold calculation requires only a small memory capacity. In the arithmetic operation according to equation (1), moreover, it is necessary only that calculation be carried out for the two terms, that is, the average of the absolute values of the deviations in the preceding cycle and the absolute value of the present deviation, so that the threshold calculation requires only a small amount of computation.

In the case of the embodiment described above, the average R(n−1, x) of the absolute value of the deviations for each cycle is stored in order to minimize the necessary memory capacity for the threshold calculation. If the memory capacity of the controller is sufficiently large, however, absolute values |E(n, x)|, |E(n−1, x)|, |E(n−2, x)|, . . . , |E(n−k, x)| of deviations for a plurality of cycles may be stored in advance so that the arithmetic processing of the above (3) can be performed once in a plurality of cycles according to the following equation (3) obtained by partially developing equation (1) as follows:

$$R(n,x)=|E(n,x)|/n+|E(n-1,x)|/n+|E(n-k,x)|/n+R(n-k-1,x)\times(n-k-1)/n. \quad (3)$$

Threshold Calculation Based on Equation (4)

In the threshold calculation method described above, the arithmetic processing of equation (1) and that of equation (2) are separately performed, and the average of the absolute values of the deviations calculated in the arithmetic processing of equation (1) is stored. Alternatively, however, arithmetic processing may be performed according to the following equation (4) determined by equations (1) and (2) so that a threshold calculated in this arithmetic processing can be stored.

(1) The present load on each moving part and a previously stored reference load are compared with each other according to the time or the position of the moving part, and a load deviation corresponding to the time or position of the moving part is calculated.

(2) The absolute value of the calculated deviation is calculated.

(3) Arithmetic processing of the following equation (4) is performed in association with the time or the position of the moving part, based on the calculated absolute value of the deviation and the threshold calculated in the preceding cycle, whereby the threshold corresponding to the time or the position of the moving part is calculated and stored.

$$L(n,x)=|E(n,x)|\times\alpha/n+\{L(n-1,x)-\beta\}\times(n-1)/n+\beta \quad (4)$$

where n is the number of cycles performed since the start of threshold calculation; x, elapsed time or position of a moving part; E(n, x), deviation at x in the n-th cycle; L(n, x), threshold at x in the n-th cycle; and $\alpha$ and $\beta$, coefficients ($\alpha>0$).

(4) The threshold calculated according to equation (4) and the detected absolute value of the deviation are compared with each other according to the time or the position of the moving part. If the threshold is exceeded by the absolute value of the deviation, abnormality of the moving part is detected.

(5) Thereafter, the processes of (1) to (4) are repeated to calculate the threshold corresponding to the time or the position of the moving part for each cycle, whereby abnormality detection can be achieved with an optimum threshold.

After the arithmetic processing of equation (4) is performed, in the process (3), newly calculated L(n, x) is overwritten and stored in a memory area in which L(n−1, x) has been stored, and the stored value is used in the arithmetic processing of equation (4) in the next cycle. If this is done, it is necessary only to store the threshold corresponding to the time or the position of the moving part for each cycle, so that the threshold calculation requires only a small memory capacity. In the arithmetic operation according to equation (4), moreover, it is necessary only that calculation be carried out for the two terms, that is, the threshold in the preceding cycle and the absolute value of the present deviation, so that the threshold calculation requires only a small amount of computation.

In the case of the embodiment described above, the threshold L(n−1, x) for each cycle is stored in order to minimize the necessary memory capacity for the threshold calculation. If the memory capacity of the controller is sufficiently large, absolute values |E(n, x)|, |E(n−1, x)|, |E(n−2, x)|, . . . , |E(n−k, x)| of deviations for a plurality of cycles may be stored in advance so that the process (3) can be performed once in a plurality of cycles according to the following equation (5) obtained by partially developing equation (4).

$$L(n,x)=\{|E(n,x)|/n+|E(n-1,x)|/n+\ldots|E(n-k,x)|/n\}\times\alpha+\{L(n-k-1,x)-\beta\}\times(n-k-1)/n+\beta. \quad (5)$$

Coefficients $\alpha$ and $\beta$

The sensitivity of abnormality detection can be adjusted by regulating set values of the coefficients $\alpha$ and $\beta$ in equations (2) and (4). If the coefficients $\alpha$ and $\beta$ are set to small values, the occurrence probability of erroneous detection of abnormality increases, though the abnormality detection sensitivity is high. If the coefficients $\alpha$ and $\beta$ are set to larger values, in contrast, the occurrence probability of erroneous abnormality detection is reduced, though the abnormality detection sensitivity is reduced. For example, an operator may adjust the values of the coefficients $\alpha$ and $\beta$ based on the abnormality detection sensitivity and the admissible probability of erroneous detection, according to molded products or production conditions.

In some cases, the distribution of the deviations may be close to a normal distribution, but in other cases, it may vary in kurtosis or skewness. If the distribution has high kurtosis, then it becomes a heavy-tail distribution, as a result, occurrence probability of erroneous abnormality detection becomes high even though the same coefficients $\alpha$ and $\beta$ as in the case of normal distribution are set. Likewise, if the distribution is high in skewness, occurrence probability of erroneous abnormality detection becomes high even though the same coefficients $\alpha$ and $\beta$ as in the case of normal distribution are set. If the kurtosis or skewness of the deviation distribution is high, therefore, the coefficients $\alpha$ and $\beta$ may be adjusted to relatively high values. In general, the kurtosis and skewness are determined according to equations (6) and (7), respectively.

$$\text{Kurtosis} = \frac{1}{N}\sum_{i=1}^{N}\left(\frac{Xi-u}{\sigma}\right)^4 \quad (6)$$

where $\sigma$ and u are a standard deviation and an average, respectively.

$$\text{Skewness} = \frac{1}{N}\sum_{i=1}^{N}\left(\frac{Xi-u}{\sigma}\right)^3 \quad (7)$$

where σ and u are a standard deviation and an average, respectively.

Use of Average of Loads, in Place of Reference Load

In the example described above, the present load on each moving part and the previously stored reference load are compared with each other according to the time or the position of the moving part, and the load deviation corresponding to the time or the position of the moving part is calculated. However, the average of loads applied during the period from the start of the threshold calculation to the present cycle may be used in place of the reference load. For example, the average of the loads corresponding to the time or the position of the moving part may be calculated according to the following equation (8).

$$D\text{mean}(n,x)=D(n,x)/n+D\text{mean}(n-1,x)\times(n-1)/n, \quad (8)$$

where n is the number of cycles performed since the start of threshold calculation; x, elapsed time or the position of the moving part; Dmean(n, x), average of the loads at x for the first to n-th cycles; and D(n, x), load at x in the n-th cycle.

Load Detecting Means

As means for detecting a load on each moving part, a conventional disturbance load observer may be built in a servo circuit or detection means, such as a strain gage, may be provided for the moving part. Alternatively, the load may be detected based on the drive current of a servomotor. Alternatively, moreover, the load may be detected based on the fact that the servomotor speed lowers if the moving part is subjected to a load opposite to its advancing direction and that the servomotor speed increases if the moving part is subjected to a load in its advancing direction. Alternatively, the load may be detected based on the fact that the position error increases if the moving part is subjected to a load opposite to its advancing direction and that the position error is reduced if the moving part is subjected to a load in its advancing direction.

Processing for abnormality detection based on the thresholds set according to the foregoing equations will now be described with reference to the flowcharts of FIGS. 2 to 5.

Figure 2:
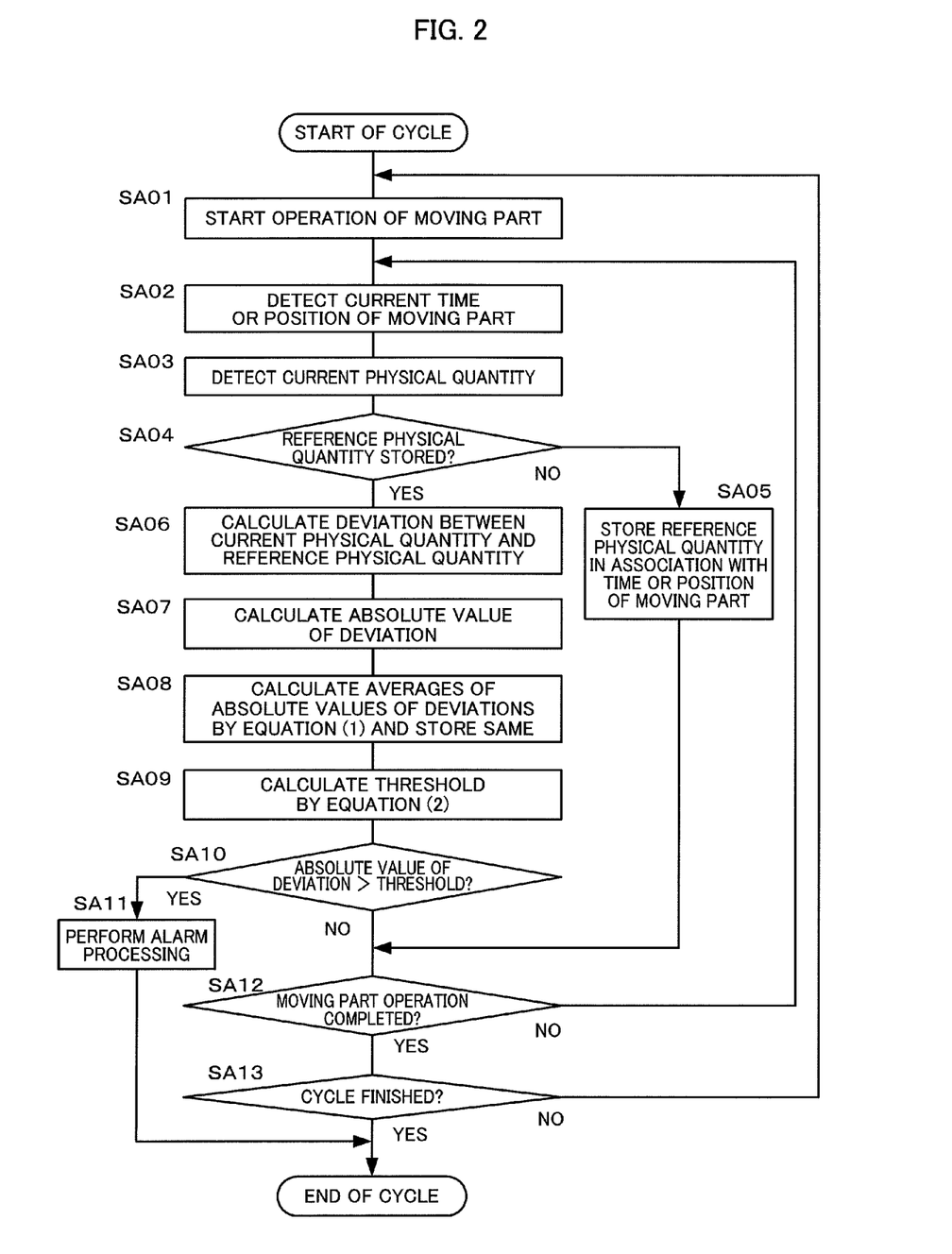
FIG. 2 is a flowchart illustrating an algorithm of a first example of abnormality detection processing performed by the abnormality detection apparatus of the invention.

A first example of abnormality detection processing performed by the abnormality detection apparatus of the present invention will first be described with reference to the flowchart of FIG. 2. The following is a sequential description of various steps of operation.

[Step SA01] An operation of the moving part is started.

[Step SA02] The current time or the position of the moving part is detected.

[Step SA03] The current physical quantity is detected.

[Step SA04] It is determined whether or not a reference physical quantity is already stored. If the reference physical quantity is already stored (YES), the program proceeds to Step SA06. If not (NO), the program proceeds to Step SA05.

[Step SA05] The reference physical quantity is stored in association with the time or the position of the moving part, whereupon the program proceeds to Step SA12.

[Step SA06] A deviation between the current physical quantity detected in Step SA03 and the reference physical quantity stored in Step SA05 is calculated.

[Step SA07] The absolute value of the deviation calculated in Step SA06 is calculated.

[Step SA08] The average of the absolute values of the deviations is calculated according to equation (1) and stored.

[Step SA09] The threshold is calculated according to equation (2).

[Step SA10] It is determined whether or not the absolute value of the deviation calculated in Step SA07 is higher than the threshold calculated in Step SA09. If the absolute value is higher (YES), the program proceeds to Step SA11. If not (NO), the program proceeds to Step SA12.

[Step SA11] Alarm processing is performed, whereupon the present cycle ends.

[Step SA12] It is determined whether or not the operation of the moving part is completed. If the operation is completed (YES), the program proceeds to Step SA13. If not (NO), the program returns to Step SA02, and this processing is continued.

[Step SA13] It is determined whether or not the present cycle is finished. If the present cycle is finished (YES), this processing ends. If not (NO), the program returns to Step SA01, and this processing is continued.

Figure 3:
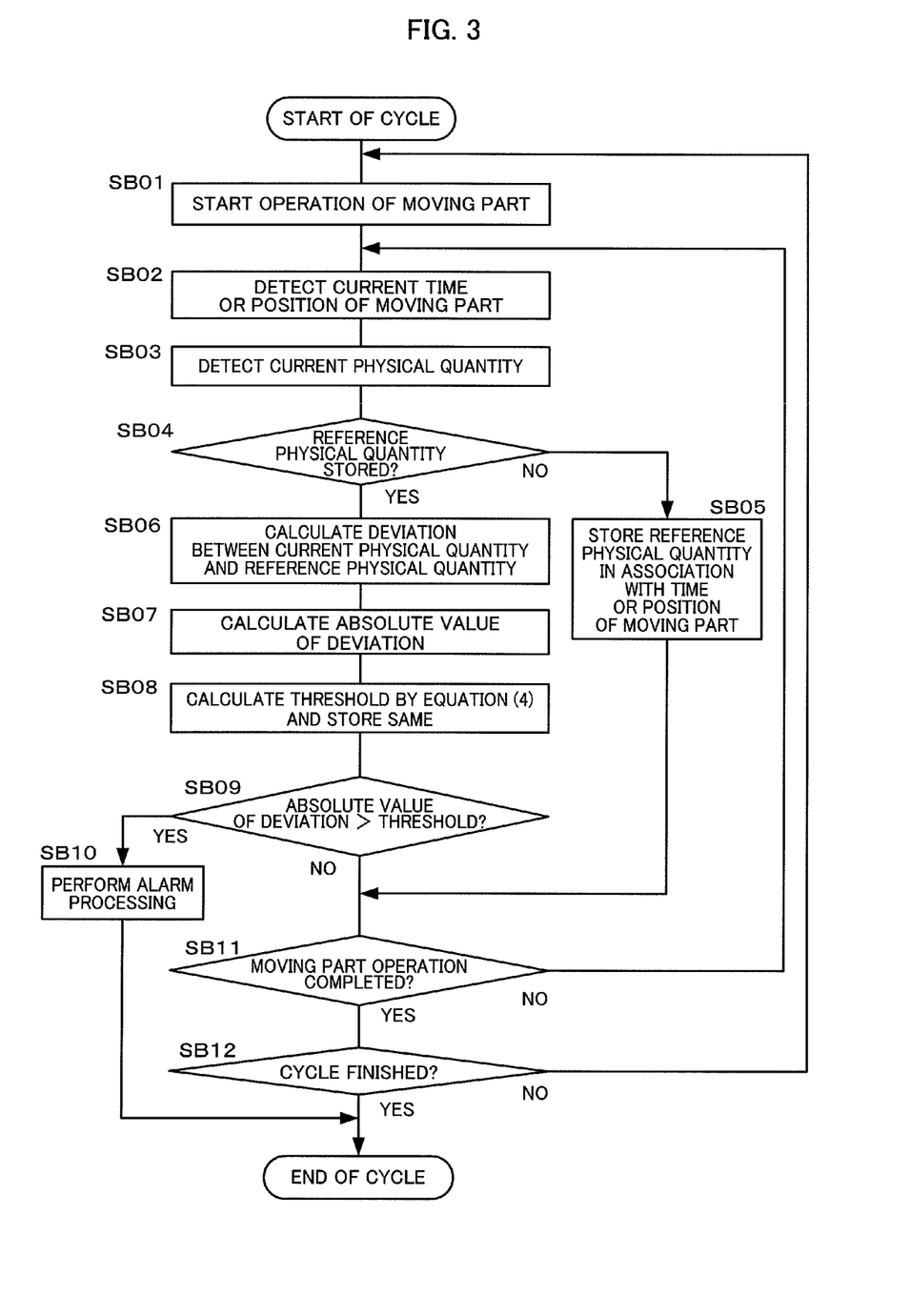
FIG. 3 is a flowchart illustrating an algorithm of a second example of abnormality detection processing performed by the abnormality detection apparatus of the invention.

A second example of abnormality detection processing performed by the abnormality detection apparatus of the present invention will now be described with reference to the flowchart of FIG. 3. The following is a sequential description of various steps of operation.

[Step SB01] An operation of the moving part is started.

[Step SB02] The current time or the position of the moving part is detected.

[Step SB03] The current physical quantity is detected.

[Step SB04] It is determined whether or not a reference physical quantity is already stored. If the reference physical quantity is already stored (YES), the program proceeds to Step SB06. If not (NO), the program proceeds to Step SB05.

[Step SB05] The reference physical quantity is stored in association with the time or the position of the moving part, whereupon the program proceeds to Step SB11.

[Step SB06] A deviation between the current physical quantity detected in Step SB03 and the reference physical quantity stored in Step SB05 is calculated.

[Step SB07] The absolute value of the deviation calculated in Step SB06 is calculated.

[Step SB08] The threshold is calculated according to equation (4) and stored.

[Step SB09] It is determined whether or not the absolute value of the deviation calculated in Step SB07 is higher than the threshold calculated in Step SB08. If the absolute value is higher (YES), the program proceeds to Step SB10. If not (NO), the program proceeds to Step SB11.

[Step SB10] Alarm processing is performed, whereupon the present cycle ends.

[Step SB11] It is determined whether or not the operation of the moving part is completed. If the operation is completed (YES), the program proceeds to Step SB12. If not (NO), the program returns to Step SB02, and this processing is continued.

[Step SB12] It is determined whether or not the present cycle is finished. If the present cycle is finished (YES), this processing ends. If not (NO), the program returns to Step SB01, and this processing is continued.

Figure 4:
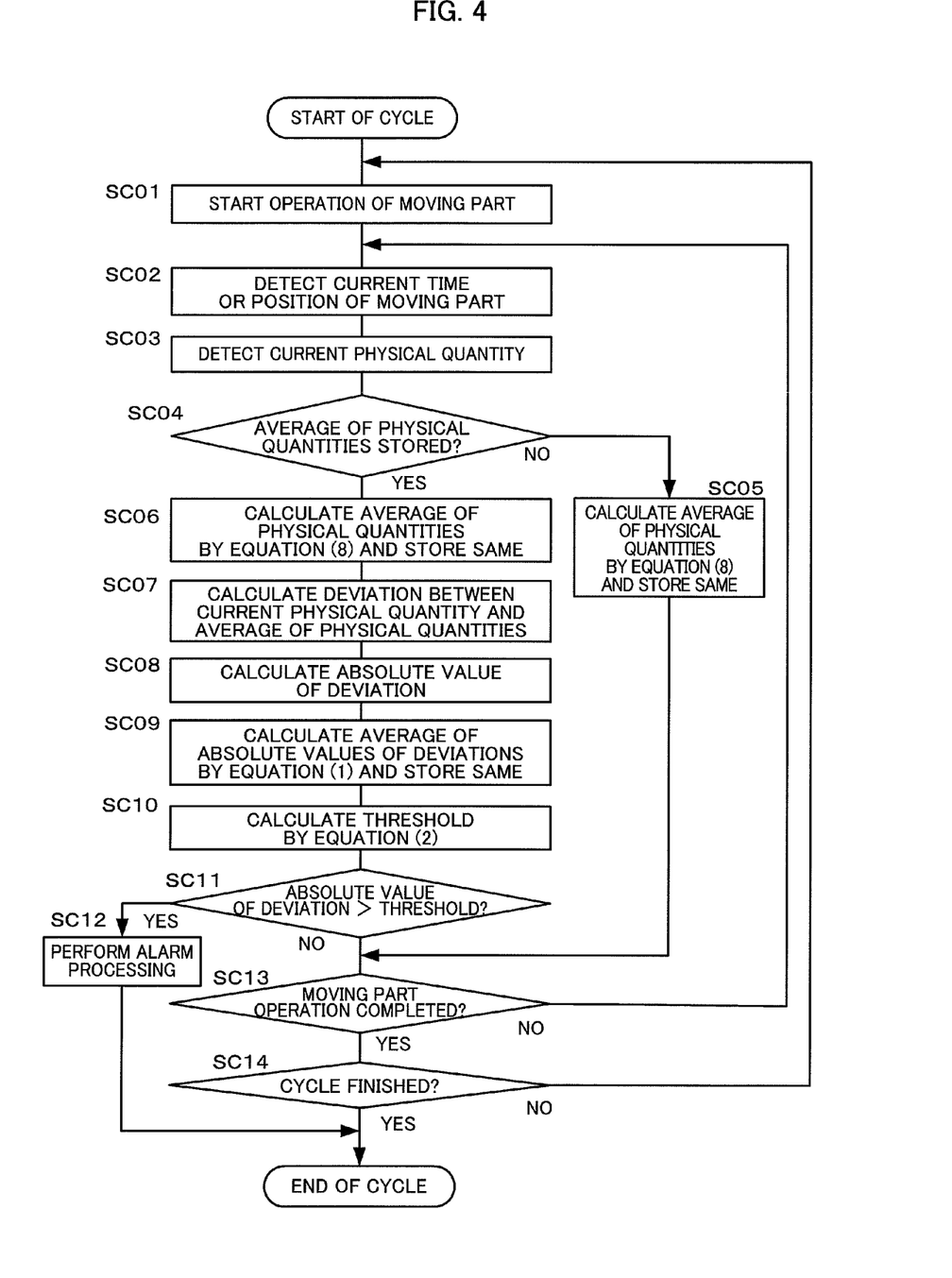
FIG. 4 is a flowchart illustrating an algorithm of a third example of abnormality detection processing performed by the abnormality detection apparatus of the invention.

A third example of abnormality detection processing performed by the abnormality detection apparatus of the present invention will now be described with reference to the flowchart of FIG. 4. The following is a sequential description of various steps of operation.

[Step SC01] An operation of the moving part is started.

[Step SC02] The current time or the position of the moving part is detected.

[Step SC03] The current physical quantity is detected.

[Step SC04] It is determined whether or not the average of physical quantities is already stored. If the average is already stored (YES), the program proceeds to Step SC06. If not (NO), the program proceeds to Step SC05.

[Step SC05] The average of the physical quantities is calculated according to equation (8) and stored, whereupon the program proceeds to Step SC13.

[Step SC06] The average of the physical quantities is calculated according to equation (8) and stored.

[Step SC07] A deviation between the current physical quantity detected in Step SC03 and the average of the physical quantities stored in Step SC06 is calculated.

[Step SC08] The absolute value of the deviation calculated in Step SC07 is calculated and stored.

[Step SC09] The average of the absolute values of the deviations is calculated according to equation (1) and stored.

[Step SC10] The threshold is calculated according to equation (2).

[Step SC11] It is determined whether or not the absolute value of the deviation calculated in Step SC08 is higher than the threshold calculated in Step SC10. If the absolute value is higher (YES), the program proceeds to Step SC12. If not (NO), the program proceeds to Step SC13.

[Step SC12] Alarm processing is performed, whereupon the present cycle ends.

[Step SC13] It is determined whether or not the operation of the moving part is completed. If the operation is completed (YES), the program proceeds to Step SC14. If not (NO), the program returns to Step SC02, and this processing is continued.

[Step SC14] It is determined whether or not the present cycle is finished. If the present cycle is finished (YES), this processing ends. If not (NO), the program returns to Step SC01, and this processing is continued.

Figure 5:
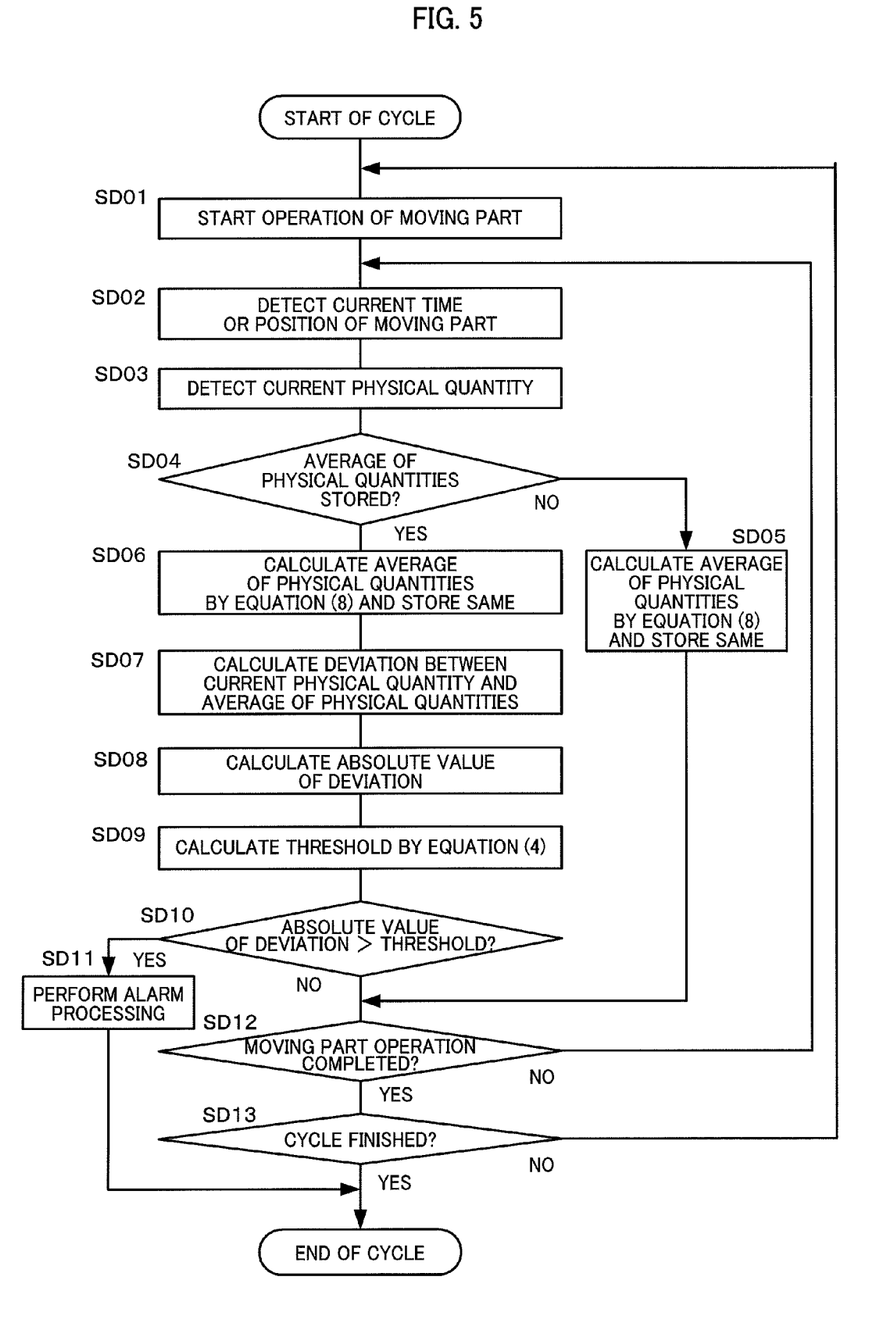
FIG. 5 is a flowchart illustrating an algorithm of a fourth example of abnormality detection processing performed by the abnormality detection apparatus of the invention.

A fourth example of abnormality detection processing performed by the abnormality detection apparatus of the present invention will now be described with reference to the flowchart of FIG. 5. The following is a sequential description of various steps of operation.

[Step SD01] An operation of the moving part is started.

[Step SD02] The current time or the position of the moving part is detected.

[Step SD03] The current physical quantity is detected.

[Step SD04] It is determined whether or not the average of physical quantities is already stored. If the average is already stored (YES), the program proceeds to Step SD06. If not (NO), the program proceeds to Step SD05.

[Step SD05] The average of the physical quantities is calculated according to equation (8) and stored, whereupon the program proceeds to Step SD12.

[Step SD06] The average of the physical quantities is calculated according to equation (8) and stored.

[Step SD07] A deviation between the current physical quantity detected in Step SD03 and the average of the physical quantities stored in Step SD06 is calculated.

[Step SD08] The absolute value of the deviation calculated in Step SD07 is calculated and stored.

[Step SD09] The threshold is calculated according to equation (4) and stored.

[Step SD10] It is determined whether or not the absolute value of the deviation calculated in Step SD08 is higher than the threshold calculated in Step SD09. If the absolute value is higher (YES), the program proceeds to Step SD11. If not (NO), the program proceeds to Step SD12.

[Step SD11] Alarm processing is performed, whereupon the present cycle ends.

[Step SD12] It is determined whether or not the operation of the moving part is completed. If the operation is completed (YES), the program proceeds to Step SD13. If not (NO), the program returns to Step SD02, and this processing is continued.

[Step SD13] It is determined whether or not the present cycle is finished. If the present cycle is finished (YES), this processing ends. If not (NO), the program returns to Step SD01, and this processing is continued.

The invention claimed is:

1. An abnormality detection apparatus of an injection molding machine, comprising:
a drive unit that drivingly controls a servomotor to drive a moving part;
a physical quantity detection unit that detects a load applied to the servomotor or a speed, current or position error of the servomotor, as a physical quantity;
a storage unit that stores the detected physical quantity as a reference physical quantity in association with an elapsed time during which the moving part operates or an operating position of the moving part;
a physical quantity deviation calculation unit that successively compares the stored reference physical quantity and a current physical quantity with each other in association with the elapsed time during which the moving part operates or the operating position of the moving part, thereby determining a deviation of the physical quantity;
an absolute value calculation unit that calculates an absolute value of the determined deviation of the physical quantity;
an average calculation unit that calculates an average of the calculated absolute values of deviations of the physical quantities; and
a threshold calculation unit that calculates a threshold corresponding to the elapsed time during which the moving part operates or the operating position of the moving part, based on the calculated absolute value of the deviation of the physical quantity, such that the threshold increases as the calculated absolute value of the deviation of the physical quantity increases,
wherein abnormality is detected if the threshold calculated by the threshold calculation unit is exceeded by the deviation of the physical quantity determined by the physical quantity deviation calculation unit.

2. The abnormality detection apparatus of an injection molding machine according to claim 1, further comprising a storage unit that stores the calculated average of the absolute values of the deviations in association with the elapsed time during which the moving part operates or the operating position of the moving part, wherein
the average calculation unit calculates the average of the absolute values of deviations of the physical quantities according to the following equation, $$R(n,x)=|E(n,x)|/n+R(n-1,x)\times(n-1)/n$$

where n is the number of cycles performed since the start of threshold calculation, x is an elapsed time or position of a moving part, R(n, x) is the average of the absolute values of deviations at x for first to n-th cycles, and E(n, x) is the deviation at x in the n-th cycle, in association with the elapsed time during which the moving part operates or the operating position of the moving part, and the threshold calculation unit calculates the threshold according to the following equation, $$L(n,x) = \alpha \times \beta R(n,x) + \beta$$

where L(n, x) is a threshold at x in the n-th cycle and $\alpha$ and $\beta$ are coefficients ($\alpha > 0$).

3. The abnormality detection apparatus of an injection molding machine according to claim 1, further comprising a storage unit that stores the calculated threshold in association with the elapsed time during which the moving part operates or the operating position of the moving part, wherein
the threshold calculation unit calculates the threshold according to the following equation $$L(n,x) = |E(n,x)| \times \alpha/n + \{L(n-1,x) - \beta\} \times (n-1)/n + \beta,$$

where n is the number of cycles performed since the start of threshold calculation, x is an elapsed time or position of a moving part, E(n, x) is a deviation at x in the n-th cycle, L(n, x) is a threshold at x in the n-th cycle, and $\alpha$ and $\beta$ are coefficients ($\alpha > 0$).

4. An abnormality detection apparatus of an injection molding machine, comprising:
a drive unit that drivingly controls a servomotor to drive a moving part;
a physical quantity detection unit that detects a load applied to the servomotor or a speed, current or position error of the servomotor, as a physical quantity;
a calculation unit that calculates an average of the physical quantities within a predetermined number of cycles in association with an elapsed time during which the moving part operates or an operating position of the moving part;
a storage unit that stores the calculated average of the physical quantities;
a physical quantity deviation calculation unit that successively compares the stored average of the physical quantities and a current physical quantity in association with the elapsed time during which the moving part operates or the operating position of the moving part, thereby determining a deviation of the physical quantity;
an absolute value calculation unit that calculates an absolute value of the determined deviation of the physical quantity;
an average calculation unit that calculates an average of the calculated absolute values of deviations of the physical quantities; and
a threshold calculation unit that calculates a threshold corresponding to the elapsed time during which the moving part operates or the operating position of the moving part, based on the calculated absolute value of the deviation of the physical quantity, such that the threshold increases as the calculated absolute value of the deviation of the physical quantity increases,
wherein abnormality is detected if the threshold calculated by the threshold calculation unit is exceeded by the deviation of the physical quantity determined by the physical quantity deviation calculation unit.

5. The abnormality detection apparatus of an injection molding machine according to claim 4, further comprising a storage unit that stores the calculated average of the absolute values of the deviations in association with the elapsed time during which the moving part operates or the operating position of the moving part, wherein
the average calculation unit calculates the average of the absolute values of deviations of the physical quantities according to the following equation, $$R(n,x) = |E(n,x)|/n + R(n-1,x) \times (n-1)/n$$

where n is the number of cycles performed since the start of threshold calculation, x is an elapsed time or position of a moving part, R(n, x) is the average of the absolute values of deviations at x for first to n-th cycles, and E(n, x) is the deviation at x in the n-th cycle, in association with the elapsed time during which the moving part operates or the operating position of the moving part, and
the threshold calculation unit calculates the threshold according to the following equation, $$L(n,x) = \alpha \times R(n,x) + \beta$$

where L(n, x) is a threshold at x in the n-th cycle and $\alpha$ and $\beta$ are coefficients ($\alpha > 0$).

6. The abnormality detection apparatus of an injection molding machine according to claim 4, further comprising a storage unit that stores the calculated threshold in association with the elapsed time during which the moving part operates or the operating position of the moving part, wherein
the threshold calculation unit calculates the threshold according to the following equation $$L(n,x) = |E(n,x)| \times \alpha/n + \{L(n-1,x) - \beta\} \times (n-1)/n + \beta,$$

where n is the number of cycles performed since the start of threshold calculation, x is an elapsed time or position of a moving part, E(n, x) is a deviation at x in the n-th cycle, L(n, x) is a threshold at x in the n-th cycle, and $\alpha$ and $\beta$ are coefficients ($\alpha > 0$).

* * * * *